United States Patent [19]

Ihara et al.

[11] Patent Number: 5,115,038

[45] Date of Patent: May 19, 1992

[54] TETRAFLUOROETHYLENE COPOLYMER AND PROCESS FOR PREPARING THE SAME

[75] Inventors: Kiyohiko Ihara; Katsuhide Ontani; Yutaka Nakata; Toshio Miyatani, all of Settsu, Japan

[73] Assignee: Daikin Industries, Ltd., Osaka, Japan

[21] Appl. No.: 698,863

[22] Filed: May 13, 1991

[30] Foreign Application Priority Data

May 14, 1990 [JP] Japan .................. 2-123470

[51] Int. Cl.$^5$ .................. C08F 8/32
[52] U.S. Cl. .................. 525/326.2; 525/326.4; 525/356; 525/378; 525/379
[58] Field of Search .................. 525/326.2, 326.4, 356, 525/378

[56] References Cited

U.S. PATENT DOCUMENTS 4,946,902 8/1990 Bekiarian et al. .................. 525/326.2

Primary Examiner—Bernard Lipman
Attorney, Agent, or Firm—Armstrong & Kubovcik

[57] ABSTRACT

A copolymer of tetrafluoroethylene and a perfluoro(alkyl vinyl ether) having the formula (I):

$$CF_2=CF-O-Rf \qquad (I)$$

wherein Rf is a perfluoroalkyl group having 3 or 4 carbon atoms; and said copolymer having 1 to 10% by weight of the perfluoro(alkyl vinyl ether) units, having 7 to 20, per $10^6$ carbon atoms, of terminal groups —$CONH_2$, having substantially no —$CH_2OH$ and no —COF, and having a melt viscosity at 380° C. of $0.1\times10^4$ to $100\times10^4$ poise and a preparation process thereof. The tetrafluoroethylene copolymer is thermally stable and has excellent powder properties. Molded articles therefrom have a few bubbles and excellent dimensional stability on heating.

2 Claims, No Drawings

TETRAFLUOROETHYLENE COPOLYMER AND PROCESS FOR PREPARING THE SAME

BACKGROUND OF THE INVENTION

The present invention relates to a melt-processable tetrafluoroethylene copolymer having excellent processability and thermal stability, and more particularly to a thermally stable tetrafluoroethylene copolymer which is obtained by stabilizing thermally unstable groups existing at the copolymer ends, and a process for preparing the same.

Copolymers prepared from tetrafluoroethylene and perfluoro(alkyl vinyl ether) (hereinafter referred to as "PFA") have been well known as a melt-processable fluorocarbon resin, and have been widely used for various uses, for instance, as starting materials for molded articles such as tubes, pipes, joints, containers and coating materials for electric wire, as coating materials, as lining materials, as starting materials for roto-molded articles such as hollow articles, and the like.

As to PFA, more or less amount of group —COF is inevitably formed at the polymer ends due to the polymerization mechanism of PFA. Also, in case of emulsion polymerization using a polymerization initiator such as ammonium persulfate (APS), groups —COOH are produced at the polymer ends, or in case of using methanol as a molecular weight controlling agent, groups —CH$_2$OH or groups —COOCH$_3$ are formed at the polymer ends. Since these terminal groups are thermally unstable, it has been known that the bubble formation during molding or the generation of fluorine-containing acids is caused from these terminal groups, thus resulting in failure of molding or corrosion of a mold of a molding machine.

Under the circumstances, a technique to stabilize these thermally unstable terminal groups has hitherto been studied and some have been proposed. For instance, Japanese Unexamined Patent Publication No. 61-98709 discloses a process for preparing a thermally stable PFA which comprises contacting PFA with ammonia gas or a nitrogen compound capable of producing ammonia for a time sufficient to convert at least 50% of terminal groups —COF and —COOH into groups —CONH$_2$.

Also, Japanese Unexamined Patent Publication No. 62-104822 discloses a method wherein PFA having more than 6, per 10$^6$ carbon atoms, of terminal groups —CF$_2$CH$_2$OH, —CONH$_2$ or —COF is contacted with a fluorine-containing gas under temperature, time and pressure conditions sufficient to decrease the number of the terminal groups to less than 6 per 10$^6$ carbon atoms.

However, when PFA prepared through the process for stabilizing the thermally unstable terminal groups according to the above-mentioned publications is subjected to the roto-molding, the obtained molded article is greatly shrunk by heating or is poor in dimensional stability on heating. Also, according to the fluorinating method disclosed in Japanese Unexamined Patent Publication No. 62-104822, it is required to conduct the reaction at a high temperature for many hours in order to heighten the conversion for fluorination. If the severe reaction conditions can be lightened even a little, such a reaction is advantageous from the viewpoints of the economy and the safety.

An object of the present invention is to provide a thermally stable PFA having excellent powder properties, which can provide a molded article having no bubbles and excellent dimensional stability.

A further object of the present invention is to provide a preparation process of the thermally stable PFA as mentioned above.

These and other objects of the present invention will become apparent from the description hereinafter.

SUMMARY OF THE INVENTION

In accordance with the present invention, there is provided a copolymer of tetrafluoroethylene and a perfluoro(alkyl vinyl ether) having the formula (I):

$$CF_2=CF-O-Rf \qquad (I)$$

wherein Rf is a perfluoroalkyl group having 3 or 4 carbon atoms;

the copolymer having 1 to 10% by weight of the perfluoro(alkyl vinyl ether) units, having 7 to 20, per 10$^6$ carbon atoms, of terminal groups —CONH$_2$, having substantially no —CH$_2$OH and no —COF, and having a melt viscosity at 380° C. of 0.1×10$^4$ to 100×10$^4$ poise.

Also, in accordance with the present invention, there is provided a process for preparing the tetrafluoroethylene copolymer as mentioned above which comprises:

contacting PFA containing 1 to 10% by weight of units of a perfluoro(alkyl vinyl ether) with fluorine gas to give a PFA having 7 to 40, per 10$^6$ carbon atoms, of the total number of terminal groups —COF and terminal groups —COOH, and contacting the resulting PFA with ammonia gas or a gaseous nitrogen-containing compound capable of forming ammonia gas to convert the groups —COF into groups —CONH$_2$.

The obtained PFA can solve the above-mentioned problems.

DETAILED DESCRIPTION

The thermally unstable groups existing in PFA at the polymer ends, namely, —CH$_2$OH, —COOH and —COOCH$_3$ are contacted with fluorine gas to finally convert into —CF$_3$ through —COF. In the course of conversion of the terminal groups containing oxygen, a state wherein only —COF and —COOH exist arises. In the present invention, the contact of the PFA with fluorine gas is stopped at the time when only —COF and —COOH exist and the total number of the groups COF and the groups —COOH is from 7 to 40, preferably from 8 to 30, per 10$^6$ carbon atoms. Accordingly, the treating conditions by fluorine gas such as time, temperature and pressure conditions can be lightened, that is, the process of the present invention is advantageous in both economy and safety.

Subsequently, the resulting PFA is contacted with ammonia gas or a gaseous nitrogen-containing compound capable of forming ammonia gas. By the contact with ammonia or the nitrogen-containing compound, the groups COF are converted into —CONH$_2$, so the obtained PFA has substantially no —COF and no —CH$_2$OH at the polymer ends. The expression "PFA has substantially no —COF and no —CH$_2$OH" means that not only PFA having completely no —COF and no —CH$_2$OH but also PFA having not more than 2, per 10$^6$ carbon atoms, of the groups —COF and —CH$_2$OH are included. Further, the number of the terminal groups —CONH$_2$ in the obtained PFA is adjusted to 7 to 20, preferably from 7 to 15, per $10^6$ carbon atoms. The obtained PFA can contain fluorine ion in the state of ammonium fluoride.

As apparent from Examples as mentioned below, when the number of the terminal groups —$CONH_2$ is within the range of from 7 to 20 per $10^6$ carbon atoms, the bubble formation can be remarkably decreased during molding. When the number of the terminal groups —$CONH_2$ is less than 7 per $10^6$ carbon atoms, the molded articles therefrom are remarkably shrunk.

The PFA used in the present invention is a copolymer of tetrafluoroethylene and a perfluoro(alkyl vinyl ether) having the formula (I):

$$CF_2=CF-O-Rf \qquad (I)$$

wherein Rf is a perfluoroalkyl group having 3 or 4 carbon atoms, which has 1 to 10% by weight of units of the perfluoro(alkyl vinyl ether) (I). As the perfluoro (alkyl vinyl ether), there are preferable the perfluoro (alkyl vinyl ether) having the formula (I) wherein Rf is the perfluoroalkyl group having 3 carbon atoms and the perfluoro(alkyl vinyl ether) having the formula (I) wherein Rf is the perfluoroalkyl group having 4 carbon atoms, concretely, perfluoro(propyl vinyl ether) and perfluoro(butyl vinyl ether). The perfluoro(alkyl vinyl ether) can be used alone or as an admixture thereof. The PFE can be in the state of a powder, pellets, flakes, and the like.

The preparation process of the present invention comprises the first step wherein the PFA containing the thermally unstable groups at the polymer ends is treated with fluorine gas and the second step wherein the resulting PFA is treated with ammonia gas or the gaseous nitrogen-containing compound capable of forming ammonia gas.

In the first step, namely the treatment with fluorine gas, the PFA containing the thermally unstable groups at the polymer ends is contacted with fluorine gas at a temperature of, generally from 150° to 250° C., preferably from 150° to 200° C. for 1 to 10 hours, preferably from 2 to 5 hours under a pressure of 1 to 10 atmospheres. Usually, the reaction is conducted under atmospheric pressure. A pure fluorine gas can be used. It is preferably to use a diluted fluorine gas with an inert gas containing from 5 to 25% by volume, preferably from 7 to 15% by volume, of fluorine gas from the viewpoint of the safety. Examples of the inert gases are, for instance, nitrogen gas, argon gas, helium gas, and the like. By the first step, namely the treatment of PFA with fluorine gas, the PFA having only —COF and —COOH at the polymer ends and having 7 to 40, per $10^6$ carbon atoms, of the total number of the two terminal groups is obtained. Accordingly, the preparation process of the present invention can be conducted at a lower temperature for a shorter time than that described in Japanese Unexamined Patent Publication No. 62-104822 wherein almost all of the terminal groups are fluorinated.

In the second step of the process of the present invention, the obtained PFA in the first step is contacted with ammonia gas or the gaseous nitrogen-containing compound capable of forming ammonia gas to convert the groups —COF into —$CONH_2$. It is preferable that the PFA is washed with an inert gas such as nitrogen gas prior to passing ammonia gas or the gaseous compound capable of forming ammonia gas. Both 100% ammonia gas and a diluted ammonia gas with an inert gas containing about 5 to 50% by volume of ammonia can be used.

The time, temperature and pressure conditions in the treatment with ammonia or the gaseous nitrogen-containing compound are not particularly limited. The treatment can be conducted at a temperature of, usually from 0° to 100° C., preferably at room temperature, for usualy from 0.5 to 5 hours, preferably from 60 to 90 minutes, under a pressure of, usually 0.5 to 10 atmospheres, preferably under atmospheric pressure. The reaction of the second step can rapidly progress to convert the groups —COF into —$CONH_2$. As a result, the obtained PFA has substantially no —COF and no —$CH_2OH$ and has 7 to 20, per $10^6$ carbon atoms, of the groups —$CONH_2$.

The thus obtained PFA contains 1 to 10% by weight, preferably from 2 to 6% by weight, of units of the perfluoro(alkyl vinyl ether), and has a melt viscosity at 380° C. of $1.0 \times 10^4$ to $100 \times 10^4$ poise, preferably $2.0 \times 10^4$ to $30 \times 10^4$ poise. When using the thus obtained PFA, the bubble formation scarcely occurs during molding, and the molded articles therefrom have a small shrinkage and excellent dimensional stability.

In the present invention, the kind and the number of the terminal groups, and the melt viscosity of PFA are measured as follows:

ANALYSIS OF THE TERMINAL GROUPS

A PFA powder is subjected to compression molding at 350° C. for 30 minutes to give a film having a thickness of 0.25 to 0.3 mm. Infrared absorption spectrum analysis of the obtained film is conducted. The kind of the terminal group is decided by comparing the obtained results with results of an infrared adsorption spectrum analysis concerning a known film. Also, the number of the terminal groups is calculated from its difference spectrum by using the following equation:

$$\text{The number of terminal groups (per } 10^6 \text{ carbon atoms)} = \frac{I \times K}{t}$$

wherein I is an absorbance, K is a correction factor and t is a film thickness. Correction factors of the terminal groups are as follows:

| Terminal group | Absorption frequency (cm$^{-1}$) | Correction factor |
|---|---|---|
| —COF | 1883 | 440 |
| —COOH | 3560 | 440 |
| —COOCH$_3$ | 1795 | 400 |
| —CONH$_2$ | 3436 | 460 |
| —CH$_2$OH | 3648 | 2300 |

The correction factors are decided from an infrared absorption spectrum concerning a model compound, in order to calculate the number, per $10^6$ carbon atoms, of the terminal groups.

The infrared absorption spectrum analysis is conducted by using a Perkin-Elmer-FTIR spectrometer 1760 X and a Perkin-Elmer-7700 professional computer which are commercially available from The Perkin-Elmer Corp., and the scanning operation is conducted 100 times.

MEASUREMENT OF MELT VISCOSITY

The melt viscosity is measured by using a Koka Shiki Flow tester commercially available from Kabushiki Kaisha Shimazu Seisakusho. A cylinder having an inside diameter of 11.3 mm is charged with the copolymer and is kept at a temperature of 380° C. for 5 minutes. Then the copolymer is extruded through an orifice having an inside diameter of 2.1 mm and a length of 8 mm under 7 kg of a piston load, the extrusion rate (g/minute) is measured. The melt viscosity is a value obtained by dividing 53150 by the extrusion rate (g/minute).

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLE 1

A tetrafluoroethylene/perfluoro(propyl vinyl ether) copolymer (a weight ratio: 97/3) was prepared in aqueous suspension polymerization according to the method described in Japanese Unexamined Patent Publication No. 189210/1983. The obtained PFA has $-CH_2OH$, $-COOCH_3$ and $-COOH$ as the terminal groups, and the number of the groups $-CH_2OH$, $-COOCH_3$ and $-COOH$ are 100, 43 and 2 per $10^6$ carbon atoms, respectively.

In a box reaction oven was sealed 15 g of the obtained PFA placed in a private tray, and the space in the oven was thoroughly substituted for nitrogen gas. A gas mixture of 10% by volume of fluorine gas and nitrogen gas was passed through the oven at a flow rate of 1.0 l/minute at 180° C. for 3 hours under atmospheric pressure. After that, the oven was stopped heating and nitrogen gas was passed through the oven instead of the gas mixture over about one hour to completely replace fluorine gas by nitrogen gas. At this time, the temperature in the oven was 30° C.

As to the obtained PFA, the kind and the number of the terminal groups were analyzed. The PFA had 28, per $10^6$ carbon atoms, of the groups $-COF$ and 3, per $10^6$ carbon atoms, of the groups $-COOH$, and had no $-CH_2OH$ and no $-COOCH_3$.

Then, a gas mixture of 50% by volume of ammonia gas and nitrogen gas was passed through the reaction oven at a flow rate of 2.0 l/minute at room temperature (about 30° C.) for 30 minutes to treat the PFA treated with fluorine gas with ammonia gas. Subsequently, nitrogen gas was passed thorugh the oven until the outlet gas showed neutrality. Then, the oven was opened to the atmosphere and the content was taken out.

As to the obtained PFA, the kind and the number of the terminal groups were analyzed and the melt viscosity was measured. The PFA had 15, per $10^6$ carbon atoms, of the groups $-CONH_2$ and a melt viscosity of $7.5 \times 10^4$ poise. (The results are shown in Table 1 as a sample No. 4.)

The same procedure as above was repeated except that the PFA was treated with fluorine gas under conditions as shown in Table 1. The kind and the number of the terminal groups, and the melt viscosity were measured in the same manner as above. The results are shown in Table 1.

Also, an output of fluorine ion of the finally obtained PFA is shown in Table 1. The output of the fluorine ion was measured as follows:

FLUORINE ION OUTPUT

In a polyethylene bottle were thoroughly stirred 10 g of a sample (in the state of a pellet, film or powder), 5 ml of water, 5 ml of methanol and 10 ml of a total ion strength adjustment buffer wherein 500 g of sodium chloride, 500 g of acetic acid, 320 g of sodium hydroxide and 5 g of sodium citrate.$2H_2O$ are dissolved in 10 l of ion-exchanged water, and the mixture is allowed to stand for 24 hours. The mixture is filtered and an amount of fluorine ion in the obtained filtrate is measured by using a fluorine ion meter (Publication No. 96-90-00) commercially available from Orion Corp.

EXAMPLE 2

Using each PFA powder (Sample Nos. 1 to 8) obtained in Example 1 and the non-treated PFA (Sample No. 9) which was the starting material, the roto-molding was conducted.

A blast-treated roto-molding mold of 3 l for molding a bottle (inside diameter: 161 mm) was coated with a mold-release compound, and was charged with 600 g of each sample Nos. 1-9. In an oven having a temperature of 380° C., the roto-molding was conducted (revolution speed: 9.4 rpm, autorotation speed: 23 rpm) for one hour. After cooling, the bottle was taken out from the mold. The obtained bottle was uniform in a thickness of 2 mm.

As to the obtained bottle, the number of bubbles, the shrinkage and the volume were measured as follows:

SHRINKAGE

An inside diameter, D (mm) of the obtained bottle according to the roto-molding is measured, and the shrinkage (%) is calculated by the following equation:

$$\text{Shrinkage} (\%) = \frac{161 - D}{161} \times 100$$

VOLUME

The obtained bottle is filled with pure water, and then a volume of the water (ml) is measured by a measuring cylinder.

THE NUMBER OF BUBBLES

The bottle is cut longitudinally with a knife, and the number of all bubbles on the inside surface of the bottle is counted with the naked eye.

TABLE 1

| Sample No. | Treatment with fluorine | | The number of the terminal groups (per $10^6$ carbon atoms) | | | | | Melt viscosity ($\times 10^4$ poise) | Fluorine ion output (ppm) | The number of bubbles | Shrinkage (%) | Volume (ml) |
| --- | --- | --- | --- | --- | --- | --- | --- | --- | --- | --- | --- | --- |
| | Temp. (°C.) | Time (hr) | After treatment with fluorine gas | | After treatment with ammonium gas | | | | | | | |
| | | | —COF | —COOH | —CONH$_2$ | —COF | —CH$_2$OH | | | | | |
| 1 | 170 | 2 | 57 | 3 | 29 | 0 | 0 | 7.6 | 40.0 | >100 | 1.55 | 3300 |
| 2 | 170 | 3 | 38 | 2 | 19 | 0 | 0 | 7.5 | 39.8 | 15 | 3.42 | 3120 |
| 3 | 180 | 2 | 40 | 3 | 21 | 0 | 0 | 7.5 | 10.8 | >100 | 3.11 | 3140 |

TABLE 1-continued

| Sample No. | Treatment with fluorine Temp. (°C.) | Treatment with fluorine Time (hr) | The number of the terminal groups (per $10^6$ carbon atoms) After treatment with fluorine gas —COF | The number of the terminal groups (per $10^6$ carbon atoms) After treatment with fluorine gas —COOH | The number of the terminal groups (per $10^6$ carbon atoms) After treatment with ammonium gas —CONH$_2$ | The number of the terminal groups (per $10^6$ carbon atoms) After treatment with ammonium gas —COF | The number of the terminal groups (per $10^6$ carbon atoms) After treatment with ammonium gas —CH$_2$OH | Melt viscosity ($\times 10^4$ poise) | Fluorine ion output (ppm) | The number of bubbles | Shrinkage (%) | Volume (ml) |
|---|---|---|---|---|---|---|---|---|---|---|---|---|
| 4 | 180 | 3 | 28 | 3 | 15 | 0 | 0 | 7.5 | 13.0 | 10 | 4.35 | 3090 |
| 5 | 200 | 2 | 25 | 1 | 14 | 0 | 0 | 7.4 | 14.4 | 3 | 4.35 | 3080 |
| 6 | 200 | 3 | 11 | 0 | 7 | 0 | 0 | 7.3 | 2.5 | 50 | 4.66 | 3040 |
| 7 | 230 | 2 | 2 | 0 | 2 | 0 | 0 | 7.3 | 1.6 | >100 | 5.28 | 3020 |
| 8 | 230 | 3 | 0 | 0 | 0 | 0 | 0 | 7.3 | 1.0 | >100 | 5.28 | 2990 |
| 9 | — | — | — | — | — | — | — | 7.7 | 0.9 | Numberless | * | * |

(Note) *Impossible to measure

As apparent from the results in Table 1, the molded articles from the PFA having 7 to 2, per $10^6$ carbon atoms, of the terminal groups —CONH$_2$ (the samples No. 2, No. 4, No. 5 and No. 6), have a few bubbles and have an allowable dimensional stability (shrinkage). Although there is not a clear correlation between the output of fluorine ion and the bubble formation or shrinkage of the molded article, there is tendency that some degree of the output of fluorine ion gives the depression of the bubble formation.

EXAMPLE 3

Treatment 1

Using a melt indexer MX-101 (commercially available from Takara Kogyo Kabushiki Kaisha), each of the PFA powder obtained in Example 1 (the samples No. 4, No. 8 and No. 9) was extruded. That is, the PFA powder was allowed to stand at 372° C. for 5 minutes, then was extruded by a piston. The obtained strand was cut into pellets having a length of 2 mm. As to the pellets, the fluorine ion output and the number of terminal groups —COF were measured.

Treatment 2

Each of the PFA powders (the samples No. 4, No. 8 and No. 9) was previously heat-treated, that is, an aluminum cup was charged with 20 g of the PFA powder and was heated in the air at 380° C. for 5 hours. Then the extrusion was conducted in the same manner as in Treatment 1, and the fluorine ion output and the number of the groups —COF were measured. The results are shown in Table 2.

in the specification and the drawings to obtain substantially the same results.

What we claim is:

1. A copolymer of tetrafluorethylene and a perfluoro(alkyl vinyl ether) having the formula (I):

$$CF_2=CF-O-Rf \qquad (I)$$

wherein Rf is a perfluoroalkyl group having 3 or 4 carbon atoms;
said copolymer having 1 to 10% by weight of the perfluoro(alkyl vinyl ether) units,
having 7 to 20, per $10^6$ carbon atoms, of terminal groups —CONH$_2$,
having substantially no —CH$_2$OH and no —COF, and having a melt viscosity at 380° C. of $0.1 \times 10^4$ to $100 \times 10^4$ poise.

2. A process for preparing a copolymer of tetrafluoroethylene and a perfluoro(alkyl vinyl ether) having the formula (I):

$$CF_2=CF-O-Rf \qquad (I)$$

wherein Rf is a perfluoroalkyl group having 3 or 4 carbon atoms; said copolymer having 1 to 10% by weight of the perfluoro(alkyl vinyl ether) units, having 7 to 20, per $10^6$ carbon atoms, of terminal groups —CONH$_2$, having substantially no —CH$_2$OH and no —COF, and having a melt viscosity at 380° C. of $0.1 \times 10^4$ to $100 \times 10^4$ poise which comprises:

contacting a copolymer of tetrafluoroethylene and a perfluoro(alkyl vinyl ether) having the formula (I):

TABLE 2

| Sample No. | Fluorine ion output (ppm) Before treatment | Fluorine ion output (ppm) Treatment 1 | Fluorine ion output (ppm) Treatment 2 | The number of —COF (per $10^6$ carbon atoms) Before treatment | The number of —COF (per $10^6$ carbon atoms) Treatment 1 | The number of —COF (per $10^6$ carbon atoms) Treatment 2 |
|---|---|---|---|---|---|---|
| 4 | 13.8 | 1.1 | 11 | 0 | 0 | 6 |
| 8 | 1.0 | 3.8 | 14 | 0 | 0 | 10 |
| 9 | 0.9 | 4.9 | 110 | 0 | 0 | 81 |

From the results as shown in Table 2, it would be understood that even if the PFA of the present invention is heated, the fluorine ion output and the number of —COF terminal groups are increased only a little, so the PFA of the present invention is thermally stable.

According to the present invention, the thermally stable PFA having excellent powder properties can be provided. The molded articles from the PFA of the present invention have a few bubbles and have the excellent dimensional stability on heating.

In addition to the elements used in the Examples, other elements can be used in the Examples as set forth $$CF_2=CF-O-Rf \qquad (I)$$

wherein Rf is as defined above, said copolymer having 1 to 10% by weight of the perfluoro(alkyl vinyl ether) units with fluorine gas to give the copolymer having the total number of terminal groups —COF and terminal groups —COOH of 7 to 40 per $10^6$ carbon atoms, and contacting the resulting copolymer with ammonia gas or a gaseous nitrogen-containing compound capable of forming ammonia gas to convert the terminal groups —COF into —CONH$_2$.

* * * * *

UNITED STATES PATENT AND TRADEMARK OFFICE
CERTIFICATE OF CORRECTION

PATENT NO. :   5,115,038
DATED      :   May 19, 1992
INVENTOR(S):   Kiyohiko IHARA et al It is certified that error appears in the above-identified patent and that said Letters Patent is hereby corrected as shown below:

On the cover page, Item [75], first line, "Katsuhide Ontani" should read -- Katsuhide Ohtani --.

Signed and Sealed this

Sixth Day of July, 1993

Attest:

MICHAEL K. KIRK

*Attesting Officer*      Acting Commissioner of Patents and Trademarks